United States Patent
Heyn et al.

(10) Patent No.: US 7,654,039 B2
(45) Date of Patent: Feb. 2, 2010

(54) METHOD OF CONTROLLING A CLOSURE DRIVE SYSTEM OF A MOTOR VEHICLE

(75) Inventors: Detlef Heyn, Kirchhain (DE); Martin Poettcher, Gross-Zimmern (DE)

(73) Assignee: ArvinMeritor GmbH, Dietzenbach (DE)

( * ) Notice: Subject to any disclaimer, the term of this patent is extended or adjusted under 35 U.S.C. 154(b) by 350 days.

(21) Appl. No.: 11/398,084

(22) Filed: Apr. 5, 2006

(65) Prior Publication Data

US 2006/0238002 A1    Oct. 26, 2006

(30) Foreign Application Priority Data

Apr. 20, 2005    (EP) .................... 05008646

(51) Int. Cl.
*E05F 15/02*    (2006.01)
(52) U.S. Cl. .......................................... 49/26
(58) Field of Classification Search ........... 318/280, 318/283, 286, 461, 466, 468; 49/26, 98
See application file for complete search history.

(56) References Cited

U.S. PATENT DOCUMENTS

| | | |
|---|---|---|
| 4,808,894 A | 2/1989 | Mizuta |
| 6,219,599 B1 | 4/2001 | Lamm et al. |
| 6,472,836 B1 | 10/2002 | Uebelein et al. |
| 7,170,244 B2 * | 1/2007 | Choby ................ 318/280 |
| 2004/0212338 A1 | 10/2004 | Shimizu et al. |
| 2007/0152615 A1 * | 7/2007 | Newman et al. ....... 318/481 |

FOREIGN PATENT DOCUMENTS

| | | |
|---|---|---|
| DE | 40 20 351 A1 | 1/1992 |
| DE | 10149578 | 4/2003 |
| EP | 0894356 | 10/1997 |
| EP | 1 054 128 A1 | 11/2000 |
| EP | 1 174 975 A1 | 1/2002 |

OTHER PUBLICATIONS

European Search Report, Oct. 10, 2005.

* cited by examiner

*Primary Examiner*—Lori L Lyjak
(74) *Attorney, Agent, or Firm*—Carlson, Caskey & Olds

(57) ABSTRACT

A method for controlling a closure drive system of a motor vehicle utilizes a control device that includes a pinch protection circuit. A supply voltage across the control device is measured, and depending on the supply voltage, a differentiation is made as to whether the pinch protection circuit is operated with pinch protection parameters for a stationary vehicle or a moving vehicle.

17 Claims, 3 Drawing Sheets

METHOD OF CONTROLLING A CLOSURE DRIVE SYSTEM OF A MOTOR VEHICLE

RELATED APPLICATIONS

The application claims priority to European Patent Application No. 05 008 646.1, which was filed on Apr. 20, 2005.

BACKGROUND OF THE INVENTION

The invention relates to a method of controlling a closure drive system of a motor vehicle that moves a component between open and closed positions.

Electronic control devices are usually used to control a closure drive system of a motor vehicle, such as that of a window lifter system or sliding roof system, for example. For a better understanding of the invention, reference is made to a control device that is arranged in a door of the vehicle, and which is part of the window lifter system. In this example, the control device is not only capable of controlling an electric window lifter, but could also control a door lock or an electrically adjustable outside mirror.

Window lifter systems are required to have pinch protection that is supposed to prevent an object from getting pinched during closing of a window. In these systems, the pinch protection is controlled based on certain vehicle parameters because the maximum forces that are admissible for a stationary vehicle are different from those for a moving vehicle. Also, the effects of an acting wind load, for example, have to be taken into consideration for pinch protection during a displacement of the window with a moving vehicle. This is why a differentiation between moving and stationary vehicles is necessary in a pinch protection system.

It is known that some pinch protection systems, which differentiate between moving and stationary vehicles, immediately use vehicle speed information. This information is typically made available via a bus system, for instance. A bus system, however, is a very expensive vehicular system that is often omitted in some vehicle types for reasons of economy. In these instances, it will not be possible to obtain vehicle speed information and, hence, on a vehicle parameter that is important for the operation of the pinch protection system.

Other known pinch protection systems are controlled by an enabling signal, which uses signals from vehicle doors and from an ignition lock in order to differentiate whether the vehicle is moving or not. This differentiation is not easy and can be inaccurate because, for instance, with the vehicle door in a closed state and a key inserted in the ignition lock, the engine may or may not be running. Thus, it is possible that parameters for a moving vehicle are incorrectly used with a stationary vehicle. Also, in such systems, additional signal lines are needed for the control device (e.g. vehicle speed signal).

It is therefore the object of the invention to provide a method of controlling a pinch protection system for a closure system that ensures an effective and low cost pinch protection without requiring a bus system or additional signal lines.

SUMMARY OF THE INVENTION

The subject invention accomplishes this by providing a method of controlling a closure drive system of a motor vehicle that utilizes a unique control device for a pinch protection circuit. A supply voltage across the control device is measured, and depending on the supply voltage, a differentiation is made whether the pinch protection circuit is operated with pinch protection parameters for a stationary vehicle or a moving vehicle.

The invention is based on using a voltage value of an onboard electrical system to differentiate between a stationary vehicle and a moving vehicle, because this voltage value will vary depending on whether an associated electric generator is driven or not. When the electric generator is not driven, the voltage value of the onboard electrical system amounts to approximately 12 volts (V). This is interpreted as the engine not being in a running state (otherwise the electric generator would be driven), and the vehicle is stationary. In this condition the control device is operated with the pinch protection parameters for a stationary vehicle. If, however, the electric generator is driven, the voltage value of the onboard electrical system is above 14 V. From this voltage value, it is concluded that the engine is running and the vehicle is moving. In this condition the control device is operated with the pinch protection parameters for a moving vehicle. Consequently, for selecting the proper mode of operation of the pinch protection circuit, it not necessary to immediately obtain information on the vehicle speed via a bus system, and separate signal lines are not required for delivering information on the condition of an ignition lock and vehicle doors.

In such arrangement, the supply voltage measured on the control device can be divided into two voltage ranges, with a differentiation being made as to whether the voltage measured on a voltage meter falls into a first voltage range or a second voltage range. When the measured voltage falls into the first voltage range, the pinch protection circuit works in a first mode of operation with the parameters for a stationary vehicle. If the measured voltage falls into the second voltage range, however, the pinch protection circuit works in a second mode of operation with the parameters that are provided for a moving vehicle. Here, the first voltage range lies below a defined threshold and the second voltage range lies above the defined threshold.

Preferably, the defined threshold lies between a voltage value delivered by a vehicle battery when the vehicle battery is not in a state of being charged, and a voltage value delivered by an electric generator that charges the vehicle battery. The voltage value that is delivered by a vehicle battery when the vehicle battery is not being charged, lies in the range of 12 to 12.5 V, whereas the voltage value delivered by an electric generator that charges the vehicle battery lies between 13.5 and 14.4 V. Thus, the first voltage range lies between 12 and 13 V, while the second voltage range lies above the threshold between 13 and 14.4 V.

Preferably, the measured supply voltage can be registered in a memory during an initialization. As the vehicle battery ages, the voltage across the vehicle battery measured by the voltage meter generally decreases, so that a threshold value between the two voltage ranges should be corrected. As such, the memory in which the supply voltage is registered during an initialization can be used to adapt the threshold and the associated voltage ranges in response to the aging of the vehicle battery.

These and other features of the present invention can be best understood from the following specification and drawings, the following of which is a brief description.

DETAILED DESCRIPTION OF THE PREFERRED EMBODIMENT

The invention may be applied to all control devices for vehicle closure systems that include a vehicle component movable between open and closed positions. These control devices could be part of a window lifter system, a sliding roof system, a back shield or partition window drive, or a drive for a flap of a vehicle body such as a hatchback or a vehicle door, for instance. For a better understanding the invention will be explained in greater detail below using the example of a window lifter system. It can be seen that the principles can be used in a similar manner with the other previously mentioned systems.

Figure 1:
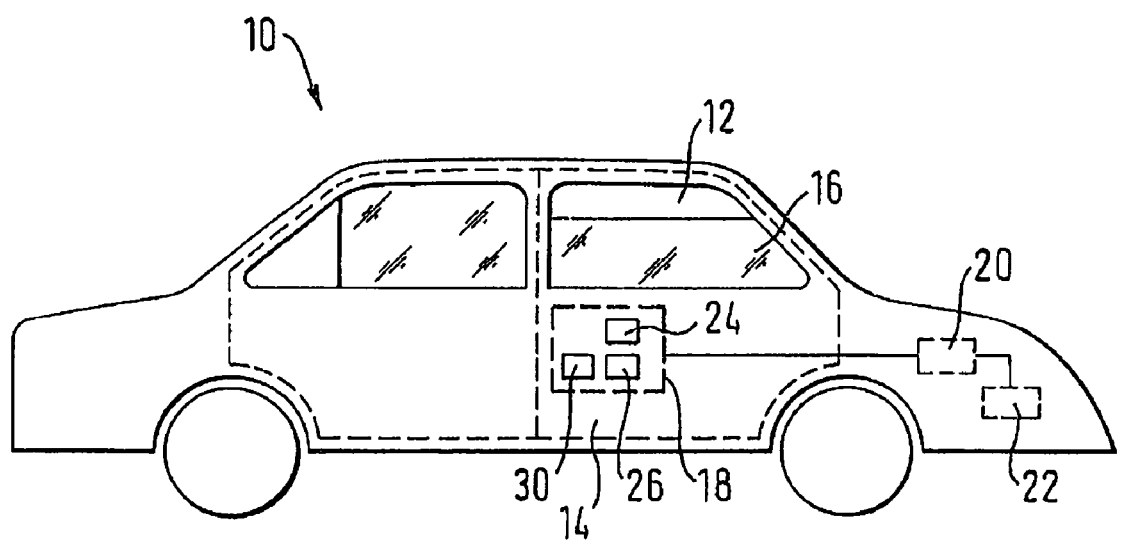
FIG. 1 is a schematic view of a vehicle with a control device according to the invention used as part of a window lifter system.

FIG. 1 shows a vehicle 10 including a window lifter system. The window lifter system has an opening 12 in a vehicle door 14, which is opened by a vertical displacement of a pane 16. The pane 16 is displaced in a known manner through a drive (not shown) from a closed position to an open position and back again. In such arrangement, the drive is coupled to a schematically shown control device 18 that is provided in the vehicle door 14.

The control device 18 is powered in a known manner by a vehicle battery 20 with a required voltage. The vehicle battery 20 in turn is coupled to an electric generator 22 that charges the vehicle battery 20 when the engine runs, so that a supply voltage across the vehicle battery 20 and the control device 18 ranges from approximately 13.5 V to 14.4 V with the engine running. When the engine is not running, the supply voltage across the control device 18 is approximately 12 to 12.5 V.

Figure 2:
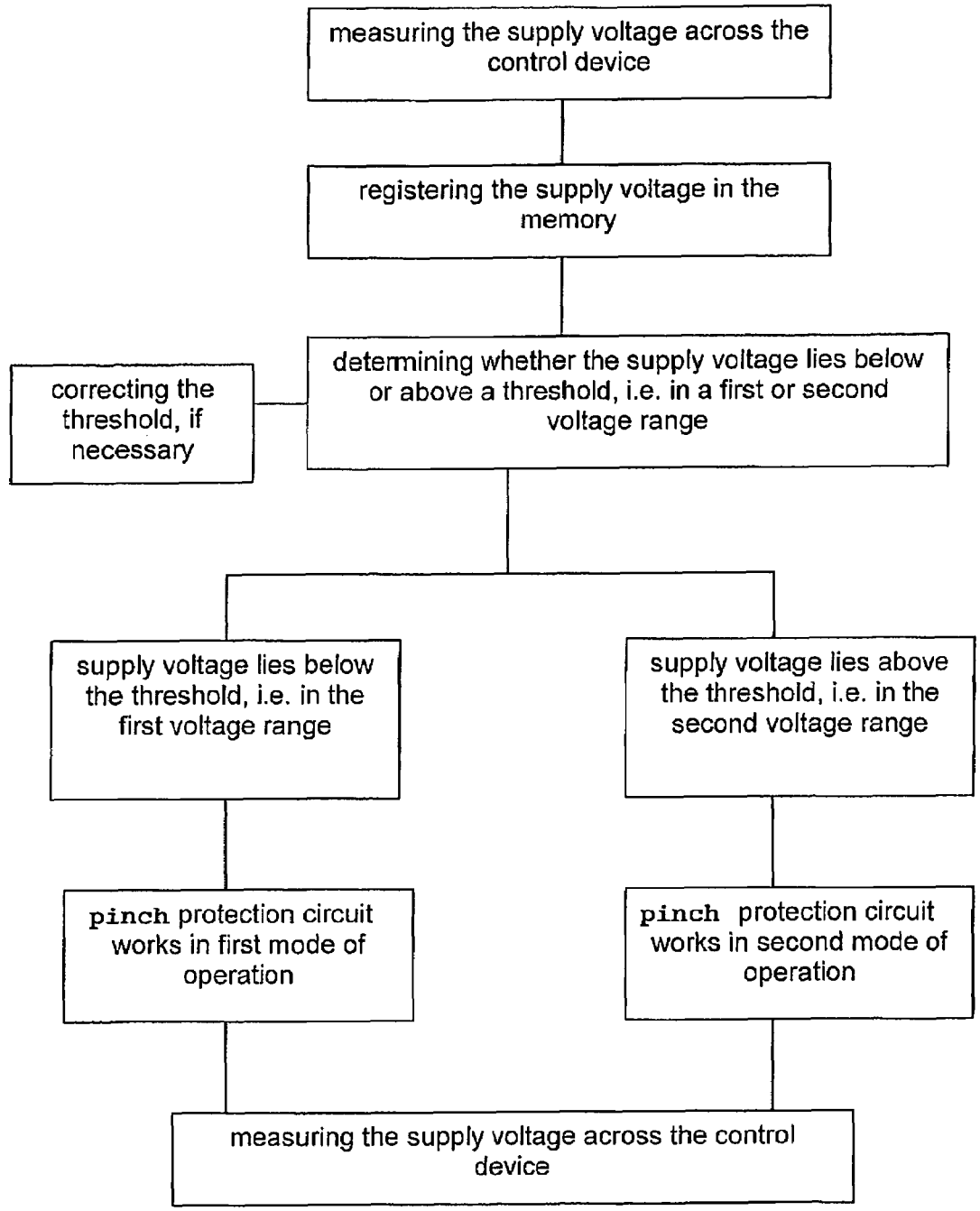
FIG. 2 is a flowchart of a method for controlling a closure drive system.

The flowchart in FIG. 2 shows the main steps of a method according to the invention for controlling the drive of the window lifter system.

Upon an initialization of the system, the measured supply voltage is registered in a memory 26 (schematically shown in FIG. 1) to obtain (with the electric generator 22 not running) a current output voltage, which, due to the age of the electric generator 22, may vary sometimes.

Then, the supply voltage across the control device 18 is measured by a voltage meter 24, shown schematically in FIG. 1. From the measured supply voltage, it is determined whether the measured supply voltage lies above or below a defined threshold. The defined threshold is approximately 13 V, and can be corrected as necessary due to potential aging of the vehicle battery 20.

Depending on the measured supply voltage, a pinch protection circuit 30 provided in the control device 18 may work in two modes of operation.

If the supply voltage is below the defined threshold, i.e. in a first voltage range of approximately 12 to 13 V, a conclusion is drawn herefrom that the electric generator 22 is not being driven and hence the engine is not running. Thus, the pinch protection circuit 30 is operated in a first mode of operation in which the pinch protection circuit 30 works with parameters for a vehicle that is stationary. Accordingly, external parameters such as wind load, bad road surfaces or the like are not taken into consideration, and the limits for the maximum pinch force allowed by law for a standing vehicle, are observed.

In case the supply voltage is above a threshold of 13 V, i.e. in the second voltage range of 13 to 14.4 V, a conclusion is drawn herefrom that the electric generator 22 is being driven to charge the vehicle battery 20, and hence the engine is running. The pinch protection circuit 30 therefore is operated in a second mode of operation in which the pinch protection circuit 30 works with the parameters for a moving vehicle. Wind load circumstances and/or enhanced frictions due to bad road surfaces, for example, are taken into consideration. This ensures that the window lifter system does not misinterpret the possibility of increased resisting forces, which occur in the closing process due to obstacles in the path of a closing window, resulting in a needless stop of the closing of the pane 16.

Independently of whether the supply voltage lies below or above the defined threshold, i.e. in the first or second voltage range, the supply voltage is measured in intervals that are defined in advance. Thus, it is determined anew whether the supply voltage lies below or above the defined threshold, i.e. in the first or second voltage range, and depending on these determinations whether the pinch protection circuit 30 works in the first or second mode of operation. A hysteresis span can be provided in a region of a threshold value S, so that a frequent switchover between the first and second modes of operation will be avoided.

Figure 3:
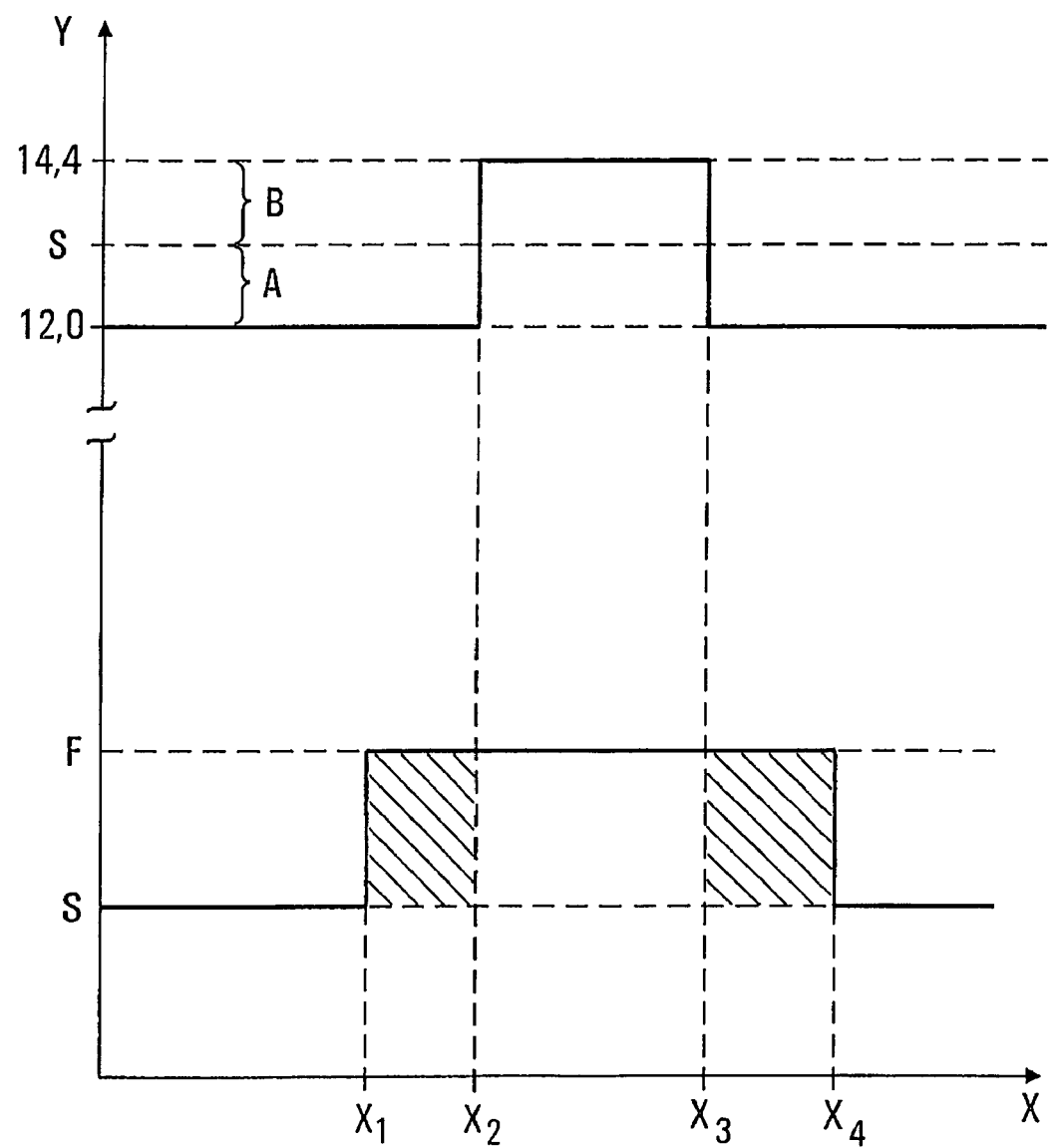
FIG. 3 is a graph of voltage vs. time that compares the method according to the invention with the prior art.

FIG. 3 shows, in a simplified fashion, a graph comparing the method according to the invention for controlling the closure system with an enabling signal used in the prior art.

Plotted on the X-axis is time t, while the supply voltage (V) and the present enabling signal are plotted on the Y-axis. With respect to the enabling signal, it is differentiated between a first mode of operation S that controls the pinch protection for a stationary vehicle, and a second mode of operation F that controls the pinch protection for a moving vehicle.

According to the invention, a basic voltage of approximately 12.0 V is available for the control of the pinch protection circuit 30 when the engine is not running. When the engine is started at time $X_2$ and the vehicle battery 20 is charged by the electric generator 22, the voltage rises to approximately 14.4 V, and then falls again to the basic voltage of 12.0 V after switching off the engine at time $X_3$. Between the two voltage values there is established the threshold of 13 V defining first and second voltage ranges A, B. The first voltage range A goes from 12 to 13 V and the second voltage range B goes from 13 to 14.4 V The pinch protection circuit 30 works in the first mode of operation S when the applied supply voltage lies in the first voltage range A. In this mode of operation S the pinch protection circuit 30 works with the parameters that are provided for a vehicle that is stationary where wind load, bad road surfaces or the like are not taken into consideration.

The pinch protection circuit 30 works in the second mode of operation F when the applied supply voltage lies in the second voltage range, i.e. when the threshold of 13 V is exceeded because the vehicle battery 20 is being charged by the electric generator 22. In the second mode of operation F the pinch protection circuit 30 works with the parameters for a moving vehicle where wind blast, bad road surfaces or the like are taken into consideration. With a moving vehicle, altered forces may be required for closing a window. Thus, adapted power reserves are made available and/or are accepted by the pinch protection circuit 30 to prevent the pinch protection circuit 30 from stopping a closing of the window although no obstacle is present.

With control of prior art pinch protection, an enabling signal is used that combines signals from an ignition lock and a vehicle door. As shown in FIG. 3, when the vehicle door is closed and a key is inserted in the ignition lock, the pinch protection at the time $X_1$ is controlled according to mode of operation F for a moving vehicle. This pinch protection will be provided with the parameters for a moving vehicle, although the key could be in the ignition lock without the engine running, and the vehicle could still be stationary. In this case, the parameter applicable to a moving vehicle would come into effect at an earlier point in time (hatched area) than with the invention. This would show the result that, during closing the window, the window has to be opposed with a higher force, so that any existing obstacle would result in stopping the closing process of the window only at a later point in time.

Further, the pinch protection is controlled according to mode of operation S for a stationary vehicle in case the key is taken out of the ignition lock, although the vehicle could already be stationary at time X3 with the ignition being switched off and the engine being in an inactive state while the key is still inserted in the ignition lock.

Thus, an exact correlation is not possible in prior art. By contrast, with the intention, the supply voltage across the control device does not increase until the engine runs, and it actually occurs only as from that time that the pinch protection circuit works in the mode of operation for a moving vehicle.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A method of controlling a vehicle closure drive system movable between an open position and a closed position and including a control device with a pinch protection circuit, comprising the following steps:
   (a) measuring a supply voltage across the control device; and
   (b) depending on the supply voltage measured in step (a), making a differentiation whether the pinch protection circuit is operated with pinch protection parameters for a stationary vehicle or a moving vehicle.

2. The method according to claim 1 wherein step (a) includes determining whether the supply voltage is above or below a defined threshold.

3. The method according to claim 2 wherein the defined threshold lies between a voltage value delivered by a vehicle battery when the vehicle battery is not in a state of being charged, and a voltage value delivered by an electric generator for charging the vehicle battery.

4. The method according to claim 2 wherein the defined threshold is approximately 13 volts (V).

5. The method according to claim 2 including correcting the defined threshold depending on an age of the vehicle battery.

6. The method according to claim 1 wherein step (a) includes determining whether the supply voltage lies in a first voltage range or a second voltage range.

7. The method according to claim 1 including providing a memory in which a measured supply voltage, which is delivered by an electric generator, is registered during an initialization.

8. The method according to claim 1 wherein the control device is used as part of a window lifter system.

9. The method according to claim 1 wherein the control device is used as part of a sliding roof system.

10. The method according to claim 1 wherein the control device is used as part of a partition window drive.

11. The method according to claim 1 wherein the control device is used as part of a drive for a flap of a vehicle body.

12. The method according to claim 11 wherein the flap is one of a hatchback and a vehicle door.

13. The method according to claim 1 wherein step (b) includes defining a first mode of operation associated with the stationary vehicle and a second mode of operation associated with the moving vehicle, and including the steps of excluding external vehicle parameters when operating in the first mode of operation and considering external vehicle parameters when operating in the second mode of operation.

14. The method according to claim 13 wherein the external vehicle parameters include at least one of a wind load input and a road load input.

15. The method according to claim 13 including defining the first mode of operation as being an engine off condition and defining the second mode of operation as an engine on condition.

16. The method according to claim 15 wherein step (a) includes determining whether the supply voltage is above or below a defined threshold that lies between a voltage value delivered by a vehicle battery when the vehicle battery is not in a state of being charged, and a voltage value delivered by an electric generator for charging the vehicle battery, and including operating in the first mode of operation when the supply voltage is below the defined threshold and operating in the second mode of operation when the supply voltage is above the defined threshold.

17. The method according to claim 13 including making adapted power reserves available to the pinch protection circuit when operating in the second mode of operation to prevent the pinch protection circuit from stopping a closing of a vehicle closure when there is no obstacle present.

* * * * *

UNITED STATES PATENT AND TRADEMARK OFFICE
CERTIFICATE OF CORRECTION

PATENT NO. : 7,654,039 B2  Page 1 of 1
APPLICATION NO. : 11/398084
DATED : February 2, 2010
INVENTOR(S) : Heyn et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 653 days.

Signed and Sealed this

Fourth Day of January, 2011

David J. Kappos
*Director of the United States Patent and Trademark Office*